US012092033B2

(12) United States Patent
Riou et al.

(10) Patent No.: US 12,092,033 B2
(45) Date of Patent: Sep. 17, 2024

(54) INTEGRATION OF A FAN FLUTTER DAMPER IN AN ENGINE CASING

(71) Applicant: SAFRAN AIRCRAFT ENGINES, Paris (FR)

(72) Inventors: Georges Jean Xavier Riou, Moissy-cramayel (FR); Jacky Novi Mardjono, Moissy-cramayel (FR); Renaud Yannick Fabien Daon, Moissy-cramayel (FR); Nicolas Pierre Alain Edme De Cacqueray-Valmenier, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 440 days.

(21) Appl. No.: 17/605,042

(22) PCT Filed: Apr. 23, 2020

(86) PCT No.: PCT/FR2020/050698
§ 371 (c)(1),
(2) Date: Oct. 20, 2021

(87) PCT Pub. No.: WO2020/221976
PCT Pub. Date: Nov. 5, 2020

(65) Prior Publication Data
US 2022/0186667 A1 Jun. 16, 2022

(30) Foreign Application Priority Data
Apr. 30, 2019 (FR) ........................................ 1904578

(51) Int. Cl.
F02C 7/24 (2006.01)

(52) U.S. Cl.
CPC .......... *F02C 7/24* (2013.01); *F05D 2250/191* (2013.01); *F05D 2250/283* (2013.01); *F05D 2260/963* (2013.01)

(58) Field of Classification Search
CPC ................. F02C 7/24; F05D 2250/191; F05D 2250/283; F05D 2260/963
See application file for complete search history.

(56) References Cited

U.S. PATENT DOCUMENTS 5,923,003 A * 7/1999 Arcas ...................... F02C 7/045
181/292
6,122,892 A * 9/2000 Gonidec .................... B32B 3/12
428/116
(Continued)

FOREIGN PATENT DOCUMENTS

EP 2846030 A1 3/2015
GB 1373063 A 11/1974

OTHER PUBLICATIONS

International Search Report in International Application No. PCT/FR2020/050698, mailed Oct. 14, 2020 (6 pages).
(Continued)

*Primary Examiner* — Forrest M Phillips
(74) *Attorney, Agent, or Firm* — Bookoff McAndrews, PLLC

(57) ABSTRACT

An acoustic treatment panel intended to be disposed on at least one wall of a turbojet in contact with a fluid flow, the panel comprising a first sheet, a second sheet parallel to the first sheet and having a first face intended to be in contact with a fluid flow and a second face facing the first sheet, and acoustic treatment cells extending between the first and second sheets and each including an enclosure and a cavity delimited by the enclosure. The enclosure of each cell comprises two openings facing one another, at least one of
(Continued)

the openings being coincident with an opening of the enclosure of an adjacent cell.

13 Claims, 4 Drawing Sheets

(56) References Cited

U.S. PATENT DOCUMENTS

| | | | |
|---|---|---|---|
| 10,125,688 B2* | 11/2018 | Loewenstein | F01D 25/30 |
| 11,248,530 B2* | 2/2022 | Gonzalez | G10K 11/172 |
| 2003/0141144 A1* | 7/2003 | Wilson | F02K 1/827 |
| | | | 181/292 |
| 2005/0284690 A1* | 12/2005 | Proscia | G10K 11/172 |
| | | | 181/210 |
| 2012/0168248 A1* | 7/2012 | Burak | F01D 9/041 |
| | | | 181/292 |
| 2015/0027629 A1 | 1/2015 | Butler et al. | |
| 2017/0167291 A1* | 6/2017 | Koroly | B64C 1/40 |
| 2018/0166058 A1 | 6/2018 | Delehouze et al. | |
| 2018/0304987 A1* | 10/2018 | Porte | B64C 1/40 |
| 2020/0143786 A1* | 5/2020 | Ravise | E04B 1/86 |
| 2022/0049657 A1* | 2/2022 | Riou | B32B 3/266 |

OTHER PUBLICATIONS

Written Opinion of the International Searching Authority in International Application No. PCT/FR2020/050698, mailed Oct. 14, 2020 (10 pages).

* cited by examiner

[Fig. 1]
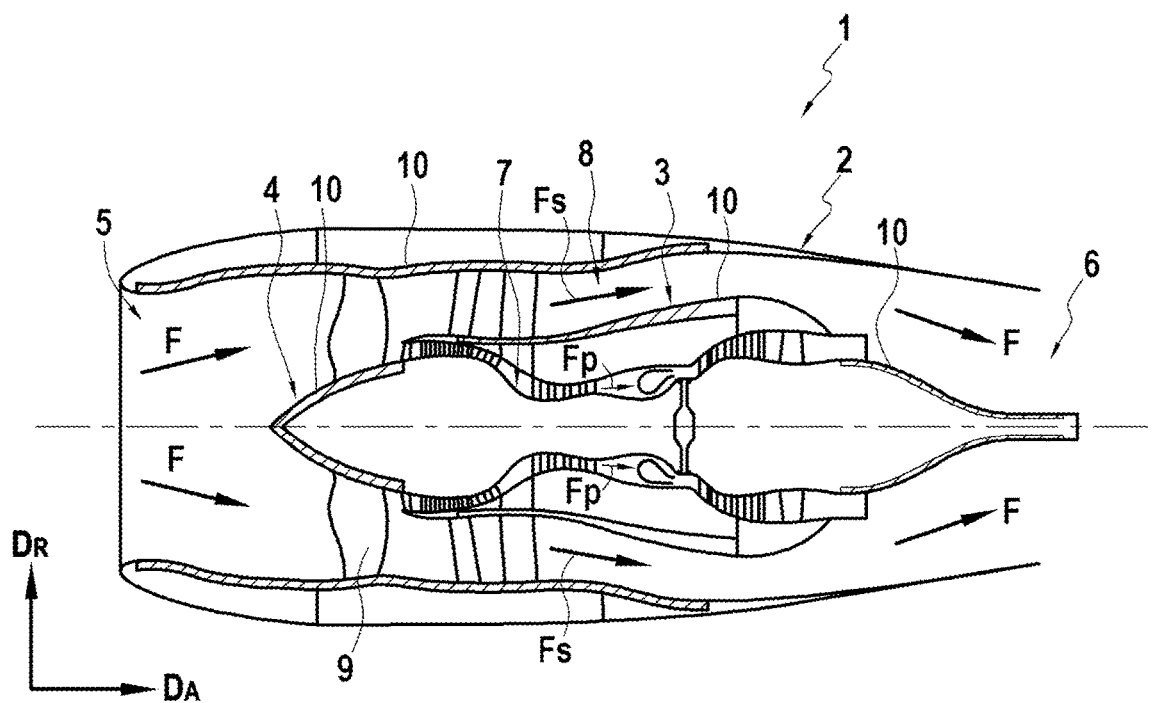
[Fig. 2]
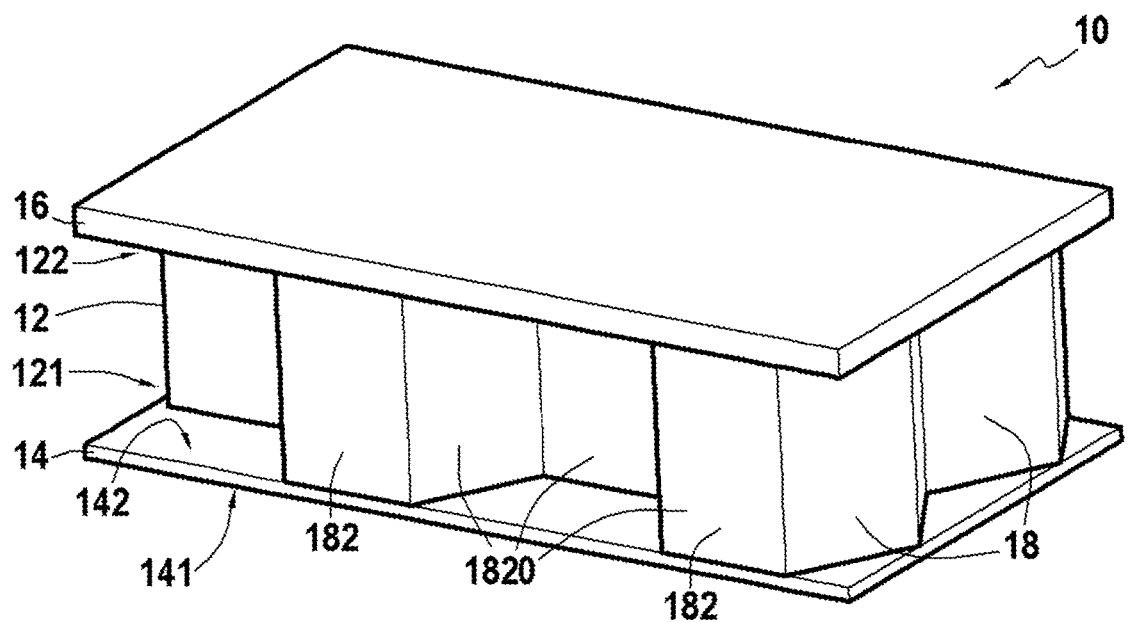

[Fig. 3]
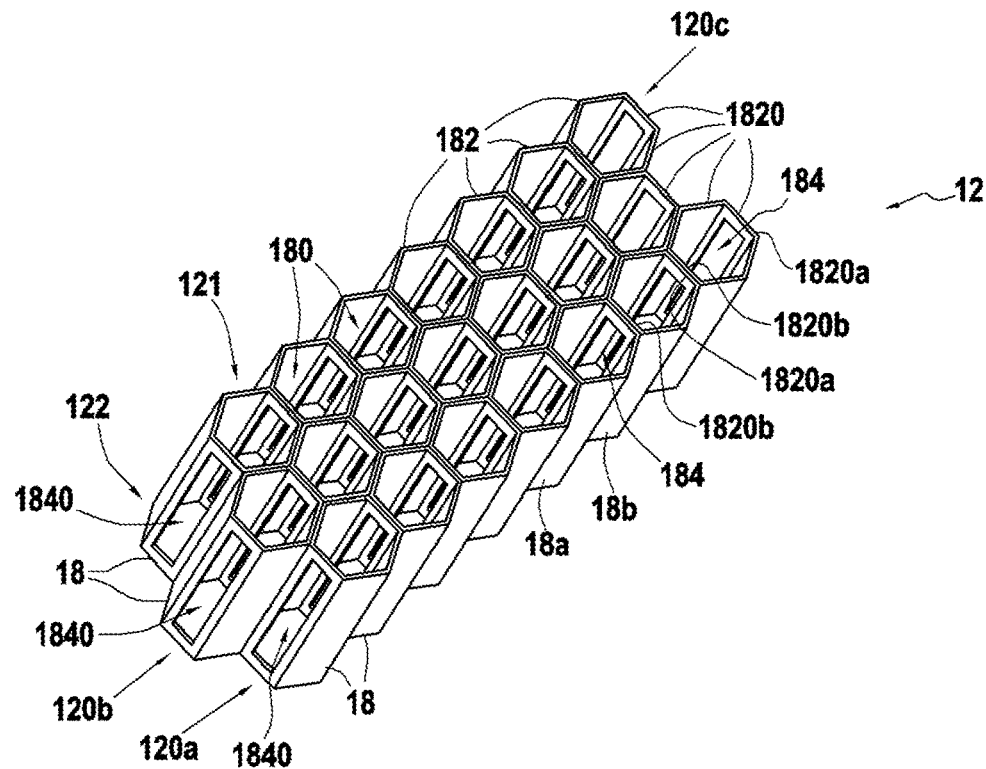
[Fig. 4]
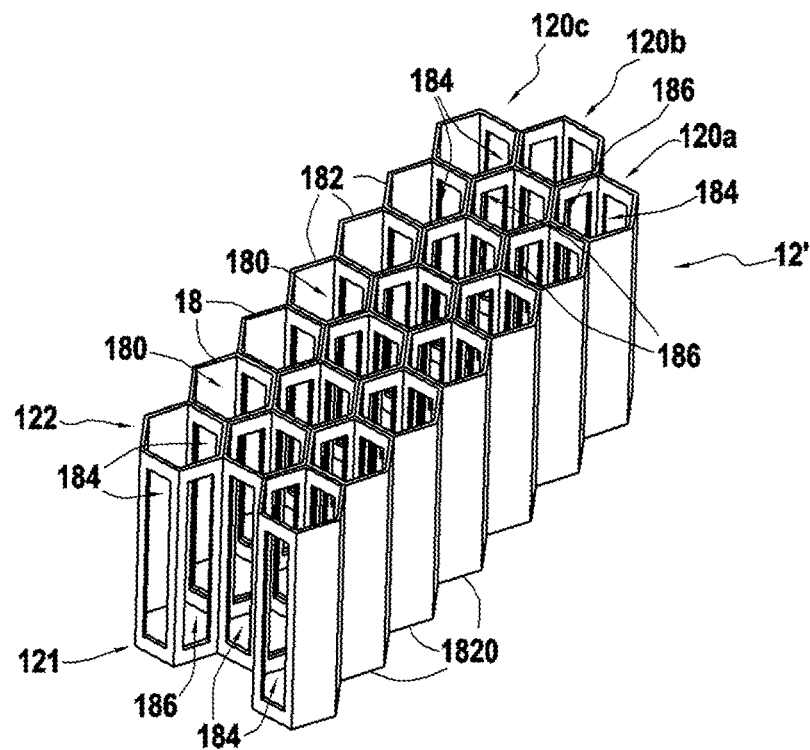

[Fig. 5]
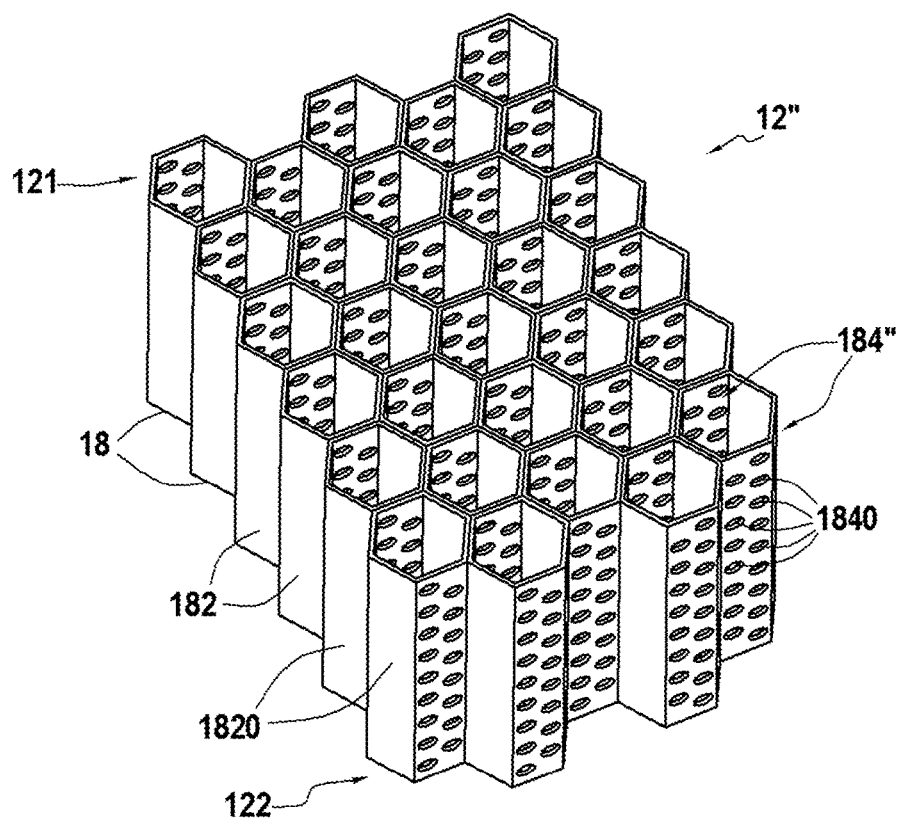
[Fig. 6]
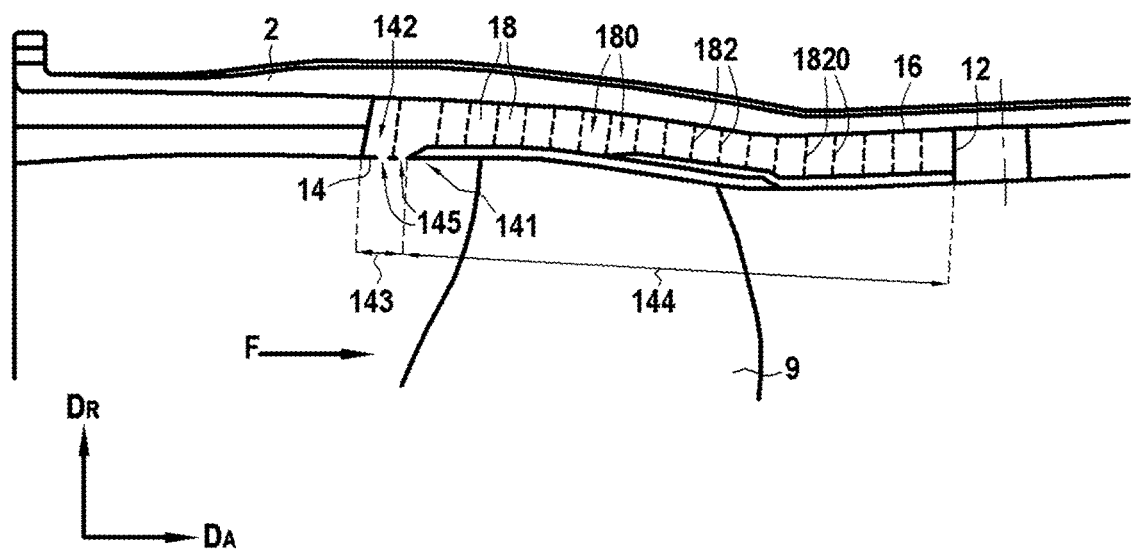

[Fig. 7]
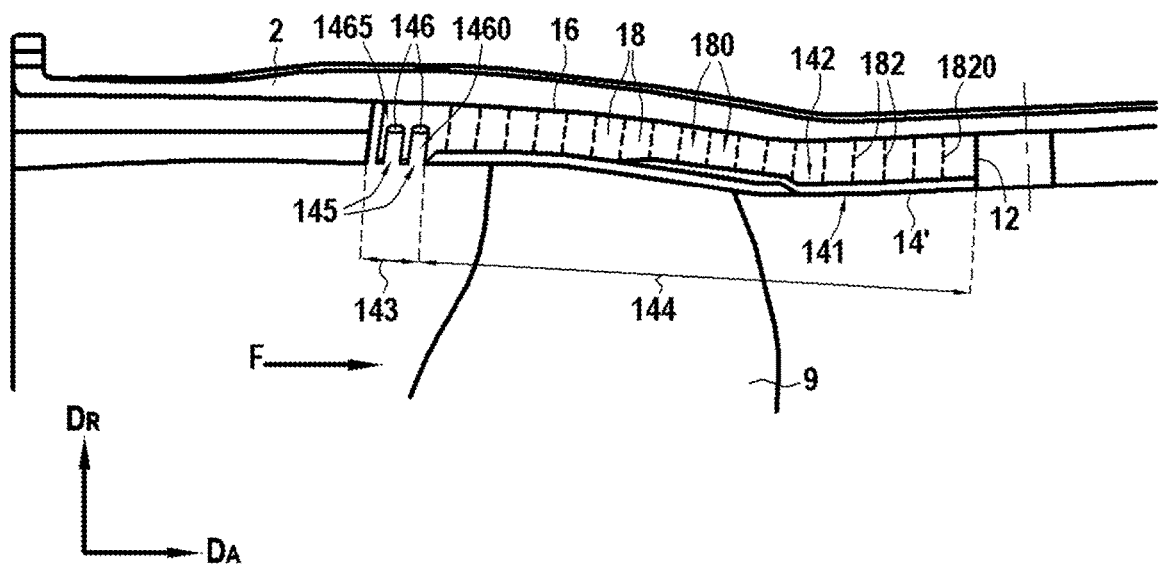
[Fig. 8]
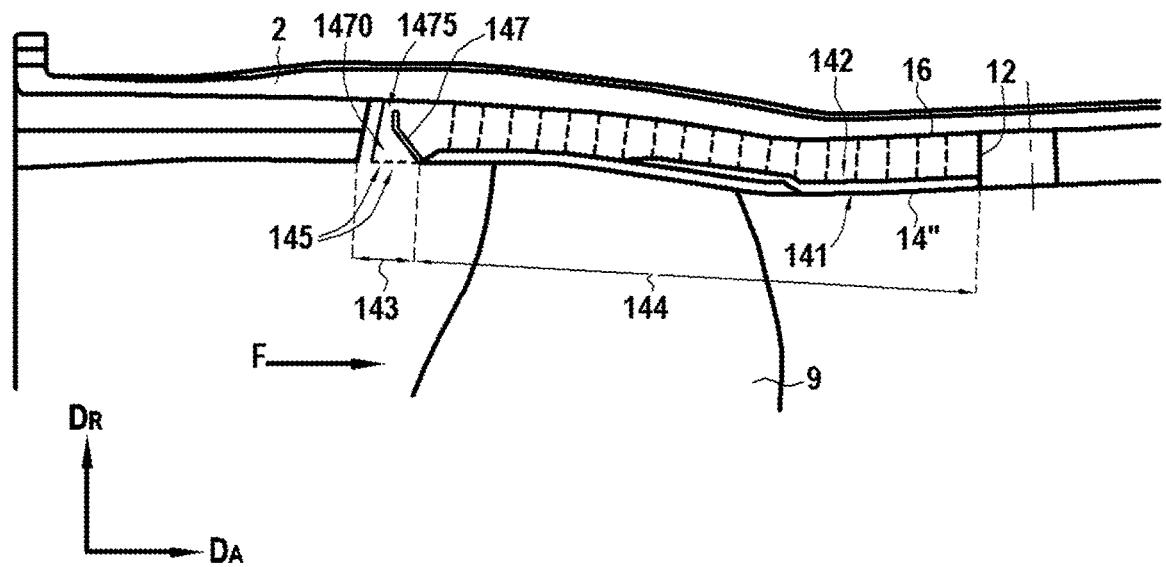

INTEGRATION OF A FAN FLUTTER DAMPER IN AN ENGINE CASING

CROSS-REFERENCE TO RELATED APPLICATION(S)

This application is the U.S. national phase entry under 35 U.S.C. § 371 of International Application No. PCT/FR2020/050698, filed on Apr. 23, 2020, which claims priority to French Patent Application No. 1904578, filed on Apr. 30, 2019.

TECHNICAL FIELD

The invention relates to the field of damping pressure waves originating in the fluid passing through the ducts of a turbomachine of an aircraft and more particularly to damping the flutter of a turbomachine.

PRIOR ART

Flutter is an aeroelastic instability liked to the coupling between the vibrations of the blade and the flow around the blading: the vibrations of the blade induce a modification of the flow, which in its turn generates vibrations of the blading. With the continuous improvement of their efficiency, the fans developed today are more and more sensitive to the phenomenon of flutter. Conventional damping technologies for flutter, such as balance weights or friction dampers for example, are incorporated into the rotation portion, for example the disk or the blade.

Another way of disposing of this problem is the addition of a specific damper in the fan casing or the air inlet lip, the type of damper most currently used being the Helmholtz resonator.

The frequencies of the pressure fluctuations associated with this flutter are generally on the order of 50 to 300 Hz. The frequencies of the pressure fluctuations associated with this flutter are therefore lower than the frequencies for which acoustic treatments are usually optimized. The volume of the cavity of a Helmholtz resonator optimized for the frequencies of the pressure fluctuations associated with this flutter is consequently particularly high, and much higher than for Helmholtz resonators usually used for acoustic treatments in a turbomachine. The result is thus a difficulty in integrating Helmholtz resonators dedicated to the treatment of pressure fluctuation frequencies associated with flutter.

Moreover, damping technologies known and used for these frequencies generally provide for adding voluminous chambers behind the acoustic air inlet lip or the fan casing to form the resonant cavities of the Helmholtz resonators, generating a large additional bulk.

The soundest technologies as regards their integration in a turbomachine at the fan casing are generally those in which the cavity is laid parallel to the engine axis. Turbojets provided with a mechanism for decoupling the fan from the turbine shaft in the event of a problem have a relatively thick honeycomb-based layer between the abradable fan cartridge and the external casing. This thickness of the honeycomb can generally be on the order of 25 to 30 mm over length of approximately 30 to 35 cm in the axial direction.

An acoustic treatment panel is known, intended to be mounted on a turbomachine comprising an external layer of non-porous material, a honeycomb core, and an internal layer of porous material, the honeycomb core being interleaved between the external layer and the internal layer. The honeycomb core comprises a plurality of walls defining the cells, or alcoves, of the honeycomb, certain of these cells possibly being in fluid communication with other cells of the honeycomb core via orifices formed in the walls of the honeycomb core. If optimized acoustic coupling is accomplished between the cells, these orifices amplify the viscothermal losses, resulting in an additional dissipation of acoustic energy and an improvement in the noise reduction of the acoustic panel.

DISCLOSURE OF THE INVENTION

The invention seeks to propose an acoustic treatment panel, particularly for damping the flutter of the fan of a turbojet, and able to be implanted without major modification into the fan casing of a turbojet, and more particularly of a turbojet equipped with a mechanism for decoupling a fan from a turbine shaft in the event of a problem.

In one object of the invention, an acoustic treatment panel is proposed, intended to be disposed on at least one wall of a turbojet in contact with a fluid flow, the panel comprising at first sheet, a second sheet parallel to the first sheet and having a first face intended to be in contact with a fluid flow and a second face facing the first sheet, and acoustic treatment cells extending between the first and second sheets and each including an enclosure and a cavity delimited by the enclosure. The acoustic treatment cells can form a honeycomb structure.

According to a general feature of the invention, the enclosure of each cell comprises two openings facing one another, at least one of the openings being coincident with an opening of the enclosure of an adjacent cell.

In addition, the second sheet comprises a non-porous portion covering at least one first acoustic treatment cell and at least one porous portion disposed facing the at least one second acoustic treatment cell and comprising at least one perforation passing through the thickness of the second sheet and allowing the sound waves to gain access directly to the at least one second acoustic treatment cell and to said at least one first acoustic treatment cell via the openings.

The acoustic treatment panel according to the invention allows the implantation of a fan flutter damper in the turbojets without having major modifications in the design of the casing of the fan, i.e. the fan casing, none of the existing functions being impacted.

The acoustic treatment panel allows using an existing volume, and not a dedicated volume, to create the acoustic channels serving as cavities of the Helmholtz resonator behind the abradable of the fan, the acoustic channels being formed by the joining of several cells aligned in a single identical direction and in communication with one another due to the openings in their respective enclosure.

The impact on the mass and the bulk of the modifications applied for the installation of an acoustic treatment panel according to the invention are minimal, and the mass penalty resulting from them is therefore relatively negligible.

Although the acoustic treatment panel according to the invention is dedicated to the damping of the fan flutter, this panel can also be transposed to the need for acoustic attenuation when the available heights behind the wall of the engine duct are very insufficient as regard the frequencies to be attenuated.

The multi-perforations form inlet orifices to the propagation channels of the acoustic treatment panel. When the acoustic treatment panel is mounted on the turbojet, the perforations are situated locally at the end of the propagation channels which is disposed upstream of the fan, unlike conventional acoustic treatment devices in which all the sheet metal over the honeycomb partitions is perforated.

To ensure the correct operation of the system, the length of the perforated zone cannot be greater than the height of the facing honeycomb cells. In other words, for a cell the length of the perforated zone is less than the height of the cell.

Thus, preferably, said at least one porous portion is situated locally at one end of the second sheet, and preferably an upstream end with respect to the flow direction of the fluid flow.

According to a first aspect of the acoustic treatment panel, the cells are disposed in mutually parallel rows and the openings of the cells of the same row are aligned in the direction of the row to define a propagation channel for sound waves passing through the openings of the cells of the row.

According to a second aspect of the acoustic treatment panel, at least one row comprises acoustic treatment cells including at least one additional opening communicating with a cell of an adjacent row.

The additional openings of the cells allow associating acoustic treatment cells to form resonant Helmholtz cavities of greater volume and thus favoring the tuning of the Helmholtz resonators toward lower frequencies, since the frequency tuning of a Helmholtz resonator depends on the volume of its resonant cavity and on the volume of its neck or of its necks.

According to a third aspect of the acoustic treatment panel, each acoustic treatment cell preferably comprises a cylindrical cavity with a hexagonal base delimited by an enclosure including six walls extending between the first sheet and the second sheet.

According to a fourth aspect of the acoustic treatment panel, each opening extends preferably over 10% to 95% of the surface of the wall on which it is formed to have sufficiently porous walls so as not to have an influence over the acoustic propagation of the acoustic propagation channels formed.

Preferably, each opening covers more than 25% of the surface of the wall on which it is formed for optimal operation, i.e. for operation in which the propagation of the waves is not affected or is little affected in each propagation channel.

According to a fifth aspect of the acoustic treatment panel, the openings can have the same geometric shape such as, for example, a generally rectangular, circular, ovoid, triangular, star or cross shape.

According to a sixth aspect of the acoustic treatment panel, each opening can be formed by a plurality of orifices. An opening thus forms a grille or a mesh in which all the orifices behave collectively like an opening formed from a single and unique large hole.

According to an eighth aspect of the acoustic treatment panel, the second sheet comprises necks each secured to one of said perforations and protruding from the second face of the second sheet between a first aperture and a second aperture.

The addition of necks to the perforations of the second sheet in the acoustic treatment cells allows favoring the tuning of the Helmholtz resonators toward lower frequencies, because the frequency tuning of a Helmholtz resonator depends on the volume of its resonant cavity and on the volume of its neck or of its necks.

According to a ninth aspect of the acoustic treatment panel, the acoustic treatment cells disposed facing the at least one perforation of the second sheet each comprises a horn extending inside the enclosure of the cell between a first aperture secured to the second sheet and a second aperture smaller than the first aperture.

Similarly, the addition of a horn in an acoustic treatment cell allows favoring the tuning of the Helmholtz resonators toward lower frequencies, because the frequency tuning of a Helmholtz resonator depends on the volume of its resonant cavity and on the volume of its neck or of its necks.

According to a ninth aspect of the acoustic treatment panel, to ensure correct operation of the acoustic treatment panel, the length in the axial direction of said portion of the sheet is less than the height of the cells disposed facing said portion of the sheet.

In another object of the invention, a turbojet is proposed comprising a nacelle provided with at least one wall comprising at least one acoustic treatment panel as defined above.

The acoustic treatment panel offers the possibility of incorporating a damping technology on a fixed portion of the turbojet, such as a nacelle or a casing, which is less constrained for controlling vibrations than the rotating portion.

Said at least one acoustic treatment panel can thus be mounted on the turbojet to form Helmholtz cavity resonators inside the fan casing, the honeycomb of the acoustic treatment panel also serving for the correct operation of the infrequent decoupling mechanism of the fan.

According to one aspect of the turbojet, at least one acoustic treatment panel can comprise sound wave propagation channels as defined above and the turbojet can define an axial direction corresponding to the axis of rotation of the turbines, and a radial direction, the propagation channels being aligned in directions not parallel to the axial direction of the turbojet.

Having acoustic treatment panes, the openings of which are aligned in a diagonal direction with respect to the axial direction of the turbojet allows providing an increase of the volume of the propagation channels for a fixed honeycomb bulk, which favors the tuning of the Helmholtz resonators toward lower frequencies.

BRIEF DESCRIPTION OF THE DRAWINGS

FIG. 1 shows a section view of a turbojet according to one embodiment of the invention, in a longitudinal plane of the turbojet.

FIG. 2 illustrates a partial perspective view of an acoustic treatment panel according to one embodiment of the invention.

FIG. 3 shows a perspective view of a first example of a honeycomb structure of the acoustic treatment panel of FIG. 2.

FIG. 4 shows a perspective view of a second example of a honeycomb structure of the acoustic treatment panel of FIG. 2.

FIG. 5 shows a perspective view of a third example of a honeycomb structure of the acoustic treatment panel of FIG. 2.

FIG. 6 shows a section view of the acoustic treatment panel of FIG. 2, with a first example of an entry layer.

FIG. 7 shows a section view of the acoustic treatment panel of FIG. 2 with a second example of an entry layer.

FIG. 8 shows a section view of the acoustic treatment panel of FIG. 2 with a third example of an entry layer.

DESCRIPTION OF THE EMBODIMENTS

Shown in FIG. 1 is a section view of a turbojet 1 according to one embodiment of the invention, in a longitudinal plane of the turbojet 1.

The turbojet 1 comprises a nacelle 2, an intermediate casing 3 and an internal casing 4. The nacelle 2 and the two casings 3 and 4 are coaxial, and define an axial direction $D_A$ and a radial direction $D_R$. The nacelle 2 defines, at a first end, an inlet channel 5 of a fluid flow and, at a second end, opposite to the first end, an exhaust channel 6 of a fluid flow. The intermediate casing 3 and the internal casing 4 delimit between them a primary fluid flow stream 7. The nacelle 2 and the intermediate casing 3 delimit between them a secondary fluid flow stream 8. The primary stream 7 and the secondary stream 8 are disposed in an axial direction $D_A$ of the turbojet 1 between the inlet channel 5 and the exhaust channel 6.

The turbojet 1 also comprises a fan 9 configured to deliver an air flow F as the fluid flow, the air flow F being divided at the outlet of the fan into a primary flow FP circulating in the primary stream 7 and a secondary flow FS circulating in the secondary stream 8.

The turbojet 1 also comprises acoustic treatment panels 10 configured to attenuate the acoustic waves emitted by the turbojet 1 before these waves escape radially to the outside from the nacelle 2 of the turbojet 1.

Each acoustic treatment panel 10 is configured to attenuate acoustic waves the frequency of which belongs in a predetermined range of frequencies. In the embodiment illustrated in FIG. 1, the acoustic treatment panels 10 are integrated into the nacelle 2, into the intermediate casing 3 and into the internal casing 4. In the internal casing 4, the acoustic treatment panels are integrated, on the one hand, on the upstream portion of the intermediate casing 3 in the axial direction $D_A$ and in particular on the lifting portion of the fan 9, and, on the other hand, on a portion downstream of the intermediate casing 3.

A partial perspective view of an acoustic treatment panel 10, according to one embodiment of the invention, is shown in FIG. 2

With reference to FIG. 2, the acoustic treatment panel 10 includes a core 12, an entry layer 14 and a reflecting layer 16.

The core 12 has a honeycomb structure. More precisely, the core 12 includes a plurality of cells 18, arranged in a known honeycomb structure. Each cell 18 forms an acoustic treatment cell for absorbing sound waves having a cylindrical shape with a hexagonal base. Each acoustic treatment cell 18 thus comprises a resonant cavity 180 of cylindrical shape with a hexagonal base and an enclosure 182 including 6 walls 1820 extending between the entry layer 14 and the reflecting layer 16.

Each cell 18 leads to a first face 121 of the core 12 and to a second face 122 of the core 18 situated opposite to the first face 121. The first face 121 of the core 12 is in contact with the entry layer 14 and is intended to be oriented toward the air stream, primary 7 or secondary 8 depending on the placement of the acoustic treatment panel 10. The second face 122 of the core 12 is in contact with the reflecting layer 16 and is intended to be oriented opposite to the air stream.

Depending on the embodiment, the core 12 can be made of metal, or of a composite material, such as a composite material formed of carbon or glass fibers embedded in a matrix of hardened resin.

The entry layer 14 can be a single-piece sheet formed by additive manufacture. The entry layer 14 has a first face 141 in contact with a fluid flow such as the flow F and a second face 142 opposite to the first face 141 and facing the core 12 and the reflecting layer 16. At least one portion of the entry layer 14 is porous. As illustrated in FIGS. 6 to 8, explained later, the porous portion 143 can comprise perforations 145 for this purpose running through the entry layer 14 and leading to cells 18 of the core 12, several perforations 145 being able to lead to the same cell 18.

The reflecting layer 16 is adapted for reflecting acoustic waves having a frequency belonging to the predetermined range of frequencies. It is secured to the walls 1820 of the enclosure 182 of the cells 18 of the core 12 at its second face 122. It can be fastened to the core 12 by gluing for example. Depending on the embodiment, the reflecting layer 16 can be made of metal or of a composite material, such as a composite material formed from carbon or glass fibers embedded in a matrix of hardened resin.

A perspective view of a first example of a honeycomb structure forming the core 12 of the acoustic treatment panel 10 of FIG. 2 is illustrated in FIG. 3.

In this first illustrated example, the cells 18 are disposed in offset gridlines and form rows 120a, 120b and 120c of cells 18 extending in directions parallel to one another.

In addition, each enclosure 182 of a cell 18 comprises two walls 1820a and 1820b facing one another, among its six walls 1820, each including a rectangular opening 184. Each cell 18 being adjacent to another cell 18, at least one of the walls 1820 of the enclosure 182 of a cell 18 is in contact or coincident with a wall 1820 of the enclosure 182 of an adjacent cell 18. When considering a first cell 18a and a second cell 18b adjacent to the first cell 18a comprising an opening 184, the walls 1820a and 1820b respectively of the first cell 18a and of the second cell 18b are adjacent or coincident and the opening 184 passes through them.

In other embodiments, the openings 184 can have another shape such as for example a circular, ovoid, triangular, star or cross shape.

As illustrated in FIG. 3, the openings 184 of the cells 18 of the same row 120a, 120b or 120c are aligned in the direction of the corresponding row 120a, 120b or 120c and thus define a propagation channel 1840 for sound waves passing through the openings 184 of the cells 18 of the row 120a, 120b, 120c.

In the embodiment illustrated in FIG. 3, each opening 184 extends over more than 25% of the surface of the wall 1820a or 1820b on which it is formed, to have open walls 1820a and 1820b sufficiently porous so as not to have an influence on acoustic propagation in the formed acoustic propagation channels 1840.

To have tuning frequency of approximately 200 Hz for the acoustic treatment panel 10 according to this first example, the acoustic treatment panel 10 has a core thickness of 30 mm and a core 12 length of 324 mm in the direction in which the rows 120a, 120b, 120c of cells 18 and the propagation channels 1840 extend, and comprising along this length 34 cells 18 the standard mesh width of which is ⅜ inch or 9.525 mm and the propagation channels 1840 of which extend in a to the axial direction $D_A$ of the turbojet 1. The openings 1840 each cover 50% of the overall surface of the walls 1820a and 1820b in which they are formed.

A perspective view of a second example of a honeycomb structure forming the core 12' of the acoustic treatment panel 10 of FIG. 2 is illustrated in FIG. 4.

The core 12' of the second example illustrated in FIG. 4 differs from the core 12 of the first example illustrated in FIG. 3 in that the cells 18 of the first row 120a and of the third row 120c comprise two additional openings 186 each communicating with a distinct cell 18 of the second row 120b, except at the ends of the acoustic treatment panel 10. And the cells 18 of the second row 120b each comprise four additional openings 186, two additional openings 186 communicating with a distinct cell 18 of the first row 120 a, and two additional openings 186 communicating with a distinct cell 18 of the third row 120c.

The additional openings 186 of the cells 18 thus allow associating acoustic treatment cells 18 to form resonant Helmholtz cavities of greater volume and thus favoring the tuning of the Helmholtz resonators toward lower frequencies, because the frequency tuning of a Helmholtz resonator depends on the volume of its resonant cavity and on the volume of its neck or of its necks.

A perspective view of a third example of a honeycomb structure forming the core 12" of the acoustic treatment panel 10 of FIG. 2 is illustrated in FIG. 5.

The core 12" of the third example illustrated in FIG. 5 differs from the core 12 of the first example illustrated in FIG. 3 in that the openings 184" are made using a set of circular orifices 1840. An opening 184 thus forms a grill or a mesh, the set of orifices 1840 of which behaves collectively like an opening 184 formed from a single and unique large hole.

In other embodiments, the orifices can have other shapes, such as for example a generally ovoid, triangular, star, or cross shape.

A section view of an acoustic treatment panel 10 of FIG. 2 mounted on the nacelle 2 at the fan casing 9, with a first example of an entry layer 14, is illustrated in FIG. 6.

As illustrated in FIG. 6, the entry layer 14 of the acoustic treatment panel 10 has a porous entry portion 143 and a non-porous portion 144 disposed downstream of the porous entry portion 143 with respect to the direction of the flow F in the turbojet 1. The porous entry portion 143 comprises perforations 145 passing through the thickness of the entry layer 14 in the radial direction $D_R$ to allow the sound waves to gain access to the cells 18 of the honeycomb core 12 of the acoustic treatment panel 10.

The non-porous portion 144 covers the surface of at least one cell. Thus, one or more cells 18 are comprised radially between two non-porous walls formed by the non-porous portion 144 of the entry layer and the reflecting layer 16.

The perforations 145 form entry passages at certain cells 18 of the panel 10 directly in communication with the perforations 145. The perforations 145 thus also form a passage for the sound waves until the upstream end of the propagation channels 1840 of the acoustic treatment panel 10, this end being located upstream of the fan 9.

In the embodiment illustrated, to tune the treatment frequency around 200 Hz at least cell 18 having perforations facing its cavity 180, the perforations 145 cover 8% of the portion of the surface of the entry layer 14 facing the cavity 180 of the cell 18. The perforations have a circular shape with a diameter of 1.5 mm, and the thickness of the porous entry portion 143 of the entry layer 14 is 1.7 mm in the radial direction. The length of the porous entry zone 143 measured in the axial direction $D_A$ is slightly smaller than the height of the facing honeycomb cells.

A perspective view of a second example of a honeycomb structure forming the core 12' of the acoustic treatment panel 10 of FIG. 2 is illustrated in FIG. 4.

A section view of the acoustic treatment panel 10 of FIG. 2, mounted on the nacelle 2 at the fan casing 9, with a second example of an entry layer 14'.

The entry layer 14' of the acoustic treatment panel 10 of the embodiment illustrated in FIG. 7 differs from the entry layer 14 of the acoustic treatment panel 10 illustrated in FIG. 6 in that it comprises, for each perforation 145, tubular necks 146 protruding radially from the second face 142 of the entry layer 14.

Each neck 146 has a hollow tubular shape forming a passage between a first orifice 1460 and a first radial end of the tube facing a perforation 145 and a second orifice 1465 at a second radial end of the tube opposite to the first end.

The addition of necks 146 to the perforations 145 of the entry layer 14 in the cells 18 allows favoring the tuning of the Helmholtz resonators formed by the cells 18 or the assemblies of cells 18 toward lower frequencies.

A section view of the acoustic treatment panel 10 of FIG. 2, mounted on the nacelle 2 at the fan casing 9, with a third example of an entry layer 14", is illustrated in FIG. 8.

The entry layer 14" of the acoustic treatment panel 10 of the embodiment illustrated in FIG. 8 differs from the entry layer 14 of the acoustic treatment panel 10 illustrated in FIG. 6 in that it comprises, for each cell 18 disposed facing the at least one perforation 145, a horn 147 extending into the cavity 180, inside the enclosure 182, between a first aperture 1470 at a first radial end of the horn 147 secured to the entry level 14 and a second aperture 1475 smaller than the first aperture 1470 and disposed at a second radial end of the horn 147 opposite to its first end.

The addition of a horn 147 in a cell 18 allows favoring the tuning of the Helmholtz resonators toward lower frequencies.

The acoustic treatment panel according to the invention thus allows damping the flutter of the fan of a turbojet, while still being able to be installed without major modification into the fan casing.

The invention claimed is:

1. An acoustic treatment panel intended to be disposed on at least one wall of a turbojet in contact with a fluid flow, the panel comprising a first sheet, a second sheet parallel to the first sheet and having a first face intended to be in contact with a fluid flow and a second face facing the first sheet, and acoustic treatment cells extending between the first and second sheets and each including an enclosure and a cavity delimited by the enclosure,
   the enclosure of each cell comprising two openings facing one another, at least one of the openings being coincident with an opening of the enclosure of an adjacent cell,
   wherein the second sheet comprises a non-porous portion covering at least one first acoustic treatment cell and at least one porous portion disposed facing the at least one second acoustic treatment cell and comprising at least one perforation passing through the thickness of the second sheet and allowing the sound waves to gain access to at least one second acoustic treatment cell and to said at least one first acoustic treatment cell via the openings.

2. The acoustic treatment panel according to claim 1, wherein said cells are disposed in mutually parallel rows and the openings of the cells of the same row are aligned in the direction of the row to define a propagation channel for sound waves passing through the openings of the cells of the row.

3. The acoustic treatment panel according to claim 2, wherein at least one row comprises acoustic treatment cells including at least one additional opening communicating with a cell of an adjacent row.

4. The acoustic treatment panel according to claim 1, wherein each acoustic treatment cell comprises a cylindrical cavity with a hexagonal base delimited by an enclosure including six walls extending between the first sheet and the second sheet.

5. The acoustic treatment panel according to claim 4, wherein each opening extends over 10% to 95% of the surface of the wall on which the opening is formed.

6. The acoustic treatment panel according to claim 5, wherein each opening covers more than 25% of the surface of the wall on which the opening is formed.

7. The acoustic treatment panel according to claim 1, wherein the openings have the same geometric shape.

8. The acoustic treatment panel according to claim 1, wherein each opening is formed by a plurality of openings.

9. The acoustic treatment panel according to claim 1, wherein the second sheet comprises a plurality of perforations and necks each secured to one of said perforations and protruding from the second face of the second sheet between a first aperture and a second aperture.

10. The acoustical treatment panel according to claim 1, wherein the acoustic treatment cells disposed facing the at least one perforation of the second sheet each comprise a horn extending inside the enclosure of the cell between a first aperture secured to the second sheet and a second aperture smaller than the first aperture.

11. The acoustic treatment panel according to claim 1, wherein the length in the axial direction of said portion of the sheet is less than the height of the cells disposed facing said portion.

12. A turbojet comprising a nacelle provided with at least one wall comprising at least one acoustic treatment panel according to claim 1.

13. The turbojet according to claim 12, wherein at least one acoustic treatment panel comprises sound wave propagation channels, each acoustic treatment cell comprises a cylindrical cavity with a hexagonal base delimited by an enclosure including six walls extending between the first sheet and the second sheet, each opening extends over 10% to 95% of the surface wall on which the opening is formed, each opening covers more than 25% of the surface of the wall on which the opening is formed, and the turbojet defines an axial direction corresponding to the axis of rotation of the turbines, the propagation channels being aligned in directions not parallel to the axial direction of the turbojet.

* * * * *